United States Patent [19]
Young et al.

[11] Patent Number: 5,839,775
[45] Date of Patent: Nov. 24, 1998

[54] LIGHTWEIGHT RUST-RESISTANT BODY ASSEMBLY FOR TOW TRUCKS AND A METHOD OF MANUFACTURE

[75] Inventors: Charles E. Young, Falling Waters, W. Va.; James J. Bartel, Southfield, Mich.

[73] Assignee: Jerr-Dan Corporation, Greencastle, Pa.

[21] Appl. No.: 551,785

[22] Filed: Nov. 7, 1995

(Under 37 CFR 1.47)

[51] Int. Cl.$^6$ ...................................................... B60P 3/12
[52] U.S. Cl. .......................... 296/183; 296/29; 296/37.6; 156/91
[58] Field of Search ................................. 296/37.1, 37.6, 296/29, 183; 280/756, 402, 848; 156/91, 92; 414/563

[56] References Cited

U.S. PATENT DOCUMENTS

| | | | |
|---|---|---|---|
| 4,650,889 | 3/1987 | Pluddemann | 556/421 |
| 4,940,279 | 7/1990 | Abott et al. | 296/183 X |
| 4,974,900 | 12/1990 | Destefani et al. | 296/187 |
| 4,978,164 | 12/1990 | Nakamura et al. | 156/92 X |
| 5,267,773 | 12/1993 | Kalis, Jr. et al. | 296/183 |
| 5,387,071 | 2/1995 | Pinkston | 414/563 |

OTHER PUBLICATIONS

Vulcan 30.25, The 750 of the Nineties, Apr. 1990.
Holan, General Service Bodies, Nov. 1960.
"Modified Acrylic Structural Adhesives", *Versilok,* Lord Industrial Adhesives, Erie, Pennsylvania (Nov. 11, 1990).

*Primary Examiner*—Andrew C. Pike
*Attorney, Agent, or Firm*—McDermott, Will & Emery

[57] ABSTRACT

A body assembly is for attachment to a tow truck chassis. The body assembly includes a left body unit and a right body unit. Each body unit has a structural unit and a plurality of exterior panels attached to the structural unit. The structural unit is preferably formed from flanged aluminum panels that are attached using adhesive disposed on the flanges. The exterior panels are preferably formed from molded composite panels. The exterior panels are removably attached to allow for simplified repair.

52 Claims, 8 Drawing Sheets

LIGHTWEIGHT RUST-RESISTANT BODY ASSEMBLY FOR TOW TRUCKS AND A METHOD OF MANUFACTURE

BACKGROUND OF THE INVENTION

The present invention relates to a body assembly for attachment to a truck chassis, and more particularly to a body assembly for attachment to a tow truck chassis.

Trucks with body assemblies attached to their chassis have long been used. The body assemblies typically have storage compartments for tools and supplies. An example of a truck with an attached body assembly that is typical of the prior art is U.S. Pat. No. 5,267,773 to Kalis, Jr. et al. (Kalis). Kalis shows a body assembly that is formed from metal panels that are welded together and then bolted to the truck chassis.

The body assemblies of the prior art, such as painted steel, suffer from a propensity to rust caused by the exposure of the metal panels to the elements particularly when used in colder climates and salt water climates. Body assemblies with welded metal panel construction have restricted styling design options and affecting repairs is difficult. Another drawback of the prior art is the need to have body assemblies that are unique to each truck chassis construction type, requiring the manufacturer and dealer to carry large inventories.

None of the prior art body assembly approaches provide the advantages of providing a panel assembly for attachment to a truck chassis that is lightweight and resistant to rust and providing a body assembly that can be adapted to multiple truck chassis construction types, along with improved styling options and simplified repair.

SUMMARY OF THE INVENTION

According to the invention, an improved adaptable body assembly having light weight and rust resistance is provided for attachment to a tow truck chassis. The improved body assembly comprises a body unit, such as a left body unit and a right body unit. Each of the body units comprise a structural unit, and at least one exterior panel attached to the structural unit. The structural unit is constructed from a plurality of panels having flanges formed on at least one edge. In a preferred embodiment the panels are formed from aluminum. The structural unit includes a front panel and a back panel that are attached on opposite ends of a plurality of compartment panels. A top panel is attached to the top of the front panel the back panel, and the plurality of compartment panels. The front panel, back panel, top panel, and compartment panels are attached by adhesive disposed on the flanges. The panels form a structural unit defining a plurality of storage compartments.

A plurality of exterior panels is attached to exterior surfaces of the structural unit. In a preferred embodiment the exterior panels are molded composite panels. An exterior panel top is attached to the top panel. An exterior front panel is attached to the front panel, and an exterior rear panel taillight assembly is attached to a rear surface of the structural unit. The exterior composite panels are lightweight and resistant to deterioration from exposure to the elements. The exterior composite panels protect the metal structural unit from exposure to the elements. The molded composite panels have improved styling capabilities over metal panels. In a preferred embodiment the molded composite panels are removably attached in order to allow for panel replacement in case of damage.

The body unit has a plurality of storage compartments with doors providing access thereto. In a preferred embodiment the doors are formed from molded composite panels.

In a preferred embodiment the front and rear panels of the structural unit are each provided with two wheel well cutouts. The structural unit can then be used for either single axle or tandem axle truck chassis. The front exterior panel is provided with either one wheel well cutout or two depending upon whether the truck chassis is single axle or tandem. If the truck chassis has a single axle the front exterior panel has one wheel well cutout that corresponds to the single axle and covers the unused wheel well cutout of the front panel. Further additional modular storage units can be disposed adjacent to a forward surface of the structural unit, increasing the length of the body assembly. This allows for a single construction type of structural unit to be used for single and tandem axle truck chassis with multiple chassis lengths cutting down on inventory required by the manufacturer and distributors.

The present invention preserves the advantages of a body assembly for attachment to a tow truck having a plurality of storage compartments. In addition, it provides great new advantages not found in currently available body assemblies and overcomes many of the disadvantages associated with the known body assemblies.

As pointed out in greater detail below, the present invention provides an improved body assembly that is lightweight, resistant to rust and deterioration caused by exposure to the elements, and adaptable to a variety of truck chassis types and sizes, with replaceable panels for simplified repair. The present invention may be adapted for use with tow trucks equipped with a variety of towing equipment as well as a wide variety of trucks and other vehicles in order to provide storage compartments.

The invention itself, together with further objects and attendant advantages, will best be understood by reference to the following detailed description, taken in conjunction with the accompanying drawings.

DESCRIPTION OF THE PREFERRED EMBODIMENTS

Figure 1:
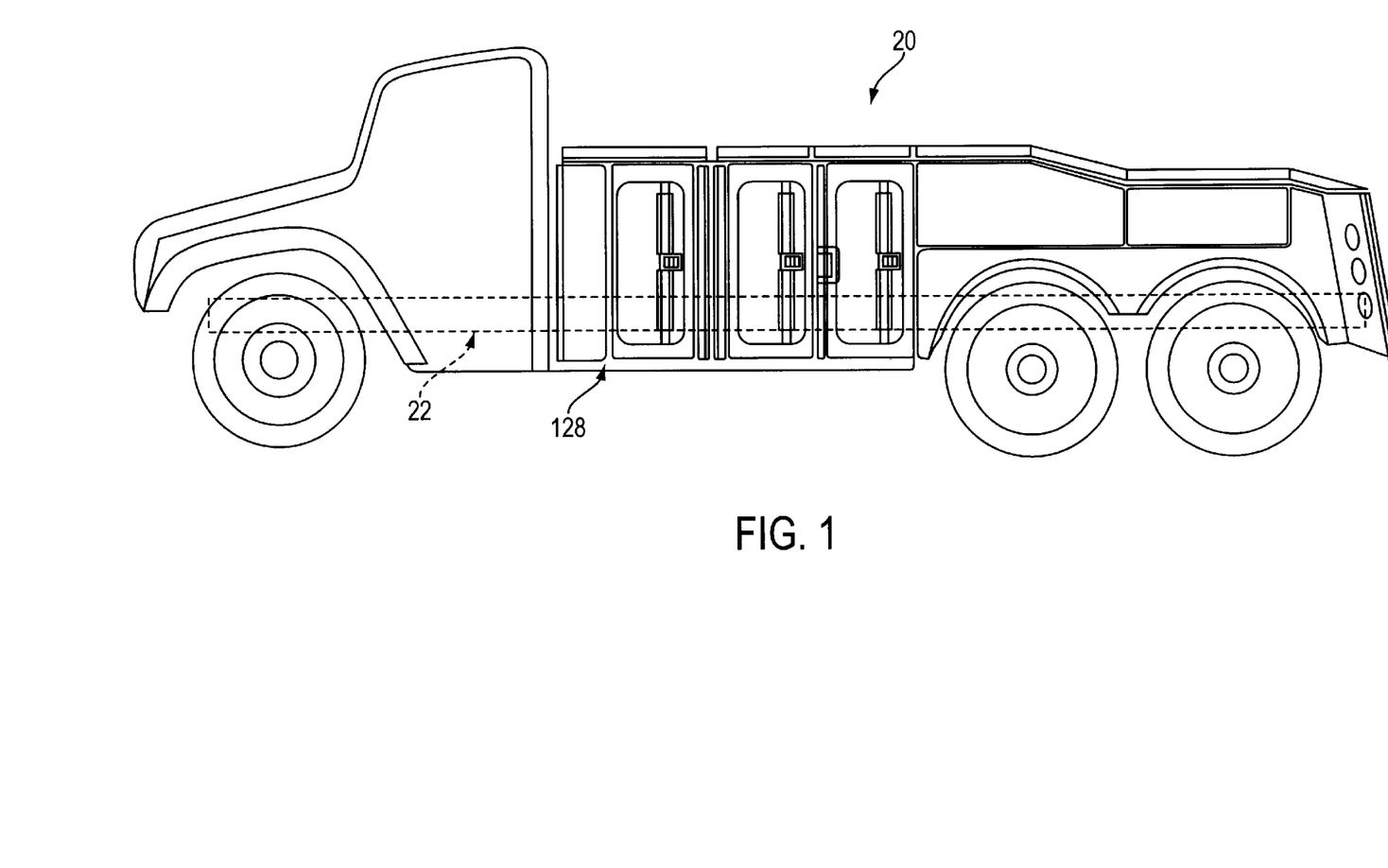
FIG. 1 is a side view of the body assembly of the present invention mounted on a truck chassis.
Figure 2:
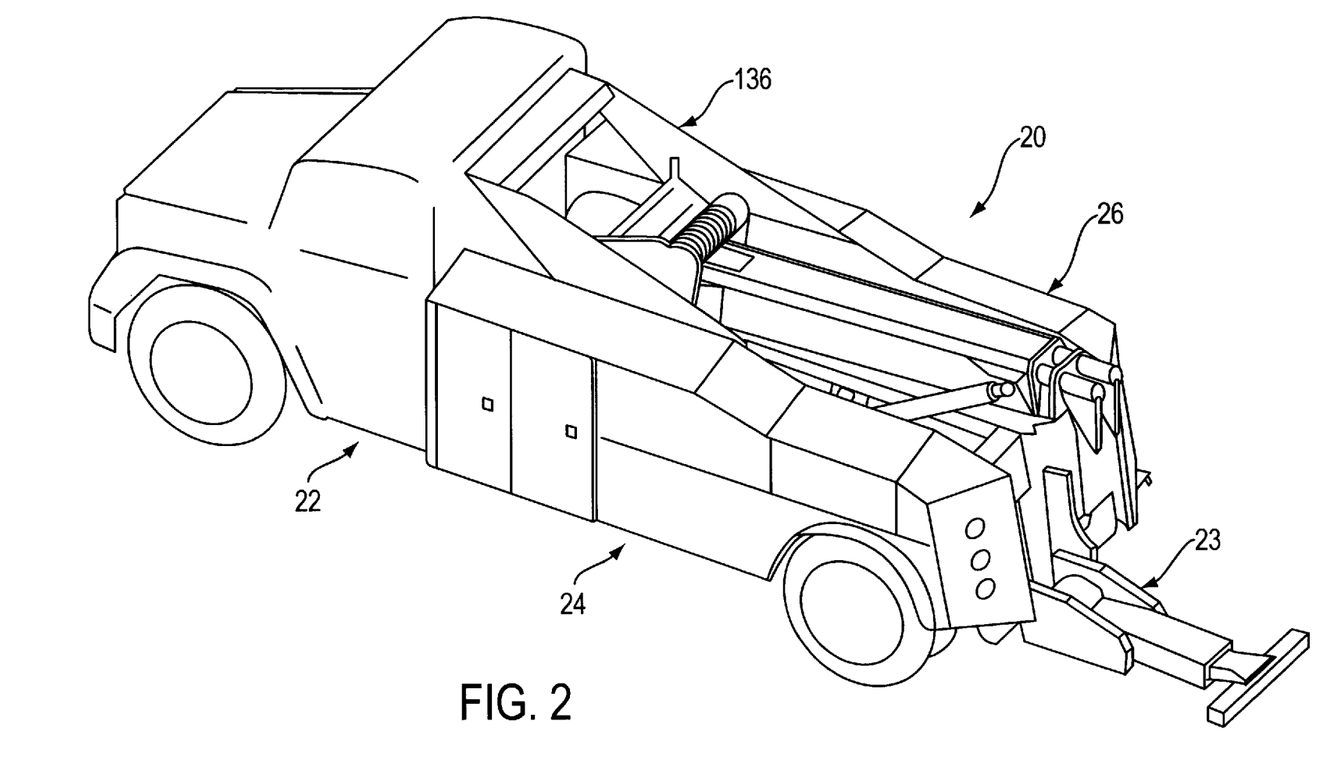
FIG. 2 is an isometric view of the body assembly of the present invention mounted on a tow truck chassis.

Turning now to the drawings, FIGS. 1 and 2 show the body assembly 20 attached to a truck chassis 22. FIG. 2 shows the body assembly attached to a tow-truck chassis that is equipped with an underlift assembly 23. The body assembly 20 includes a left body unit 24 and a right body unit 26. The left body unit 24 and the right body unit 26 each have a structural unit 28 as shown in FIG. 3, and a plurality of exterior panels 30 attached to the structural unit 28, as shown in FIGS. 5–8.

Figure 3:
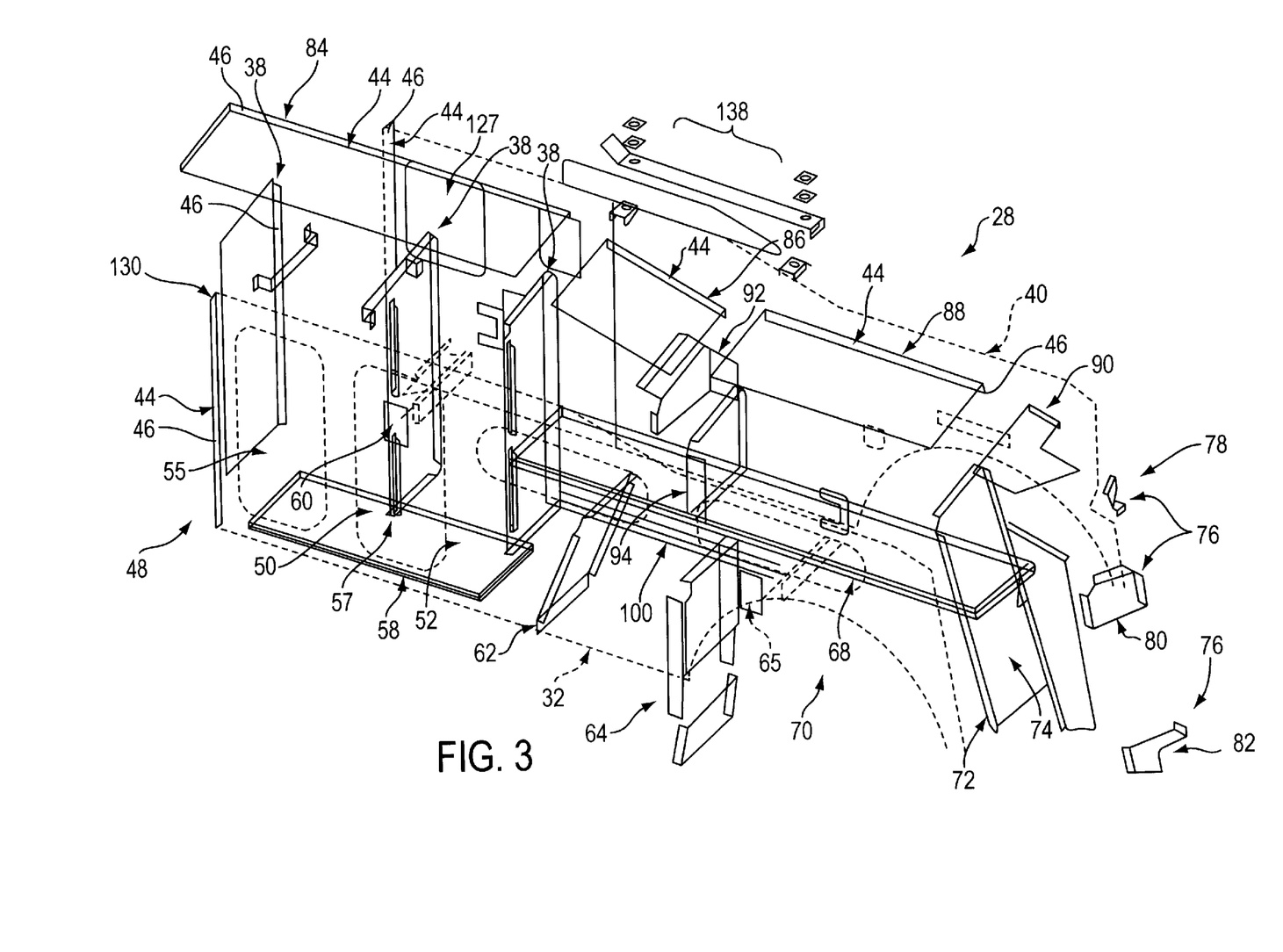
FIG. 3 is an exploded view of the preferred embodiment of a structural unit of the present invention.
Figure 4:
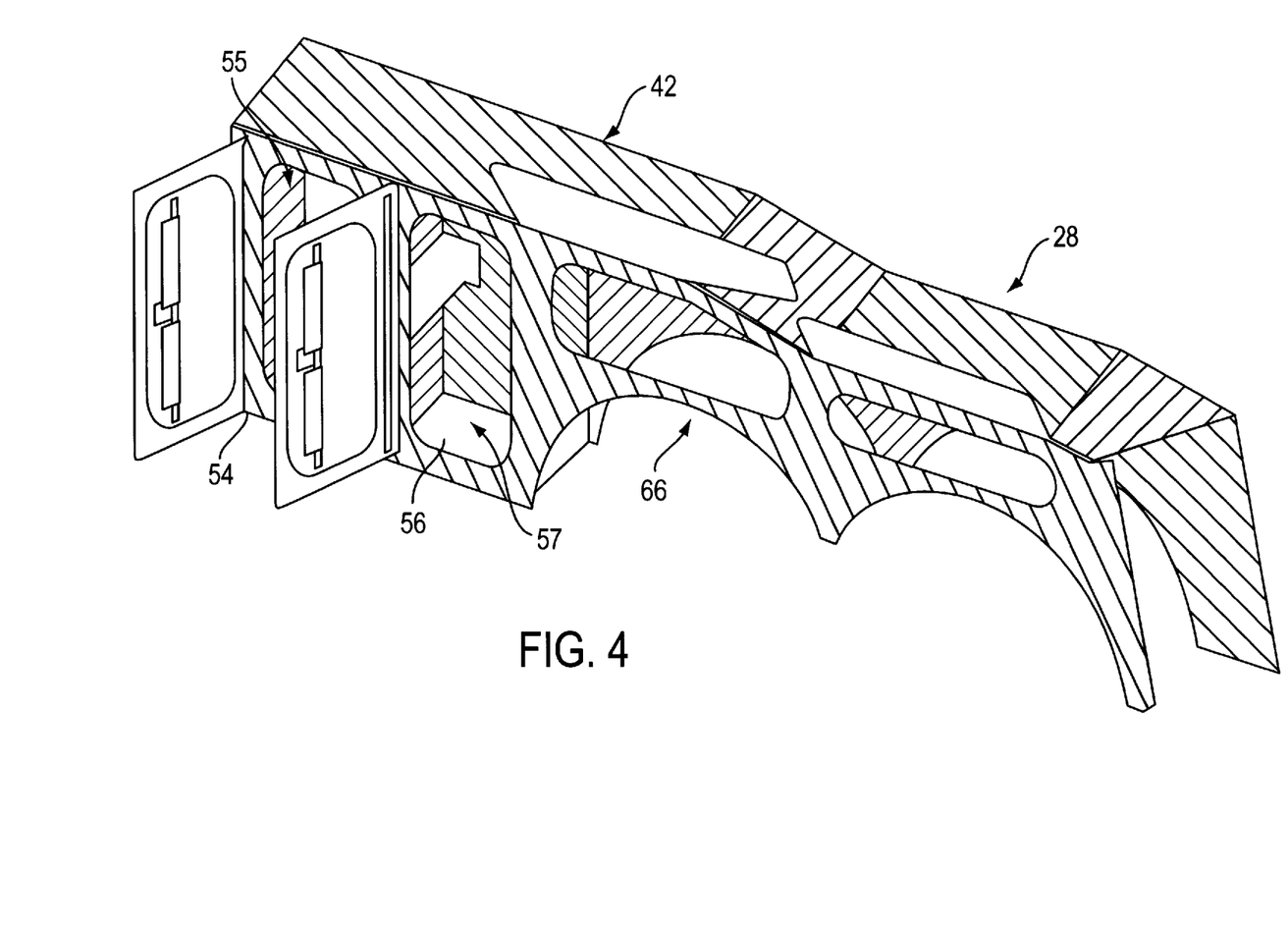
FIG. 4 is an isometric view a structural unit of the present invention wherein the structural panels are composed of aluminum.
Figure 5:
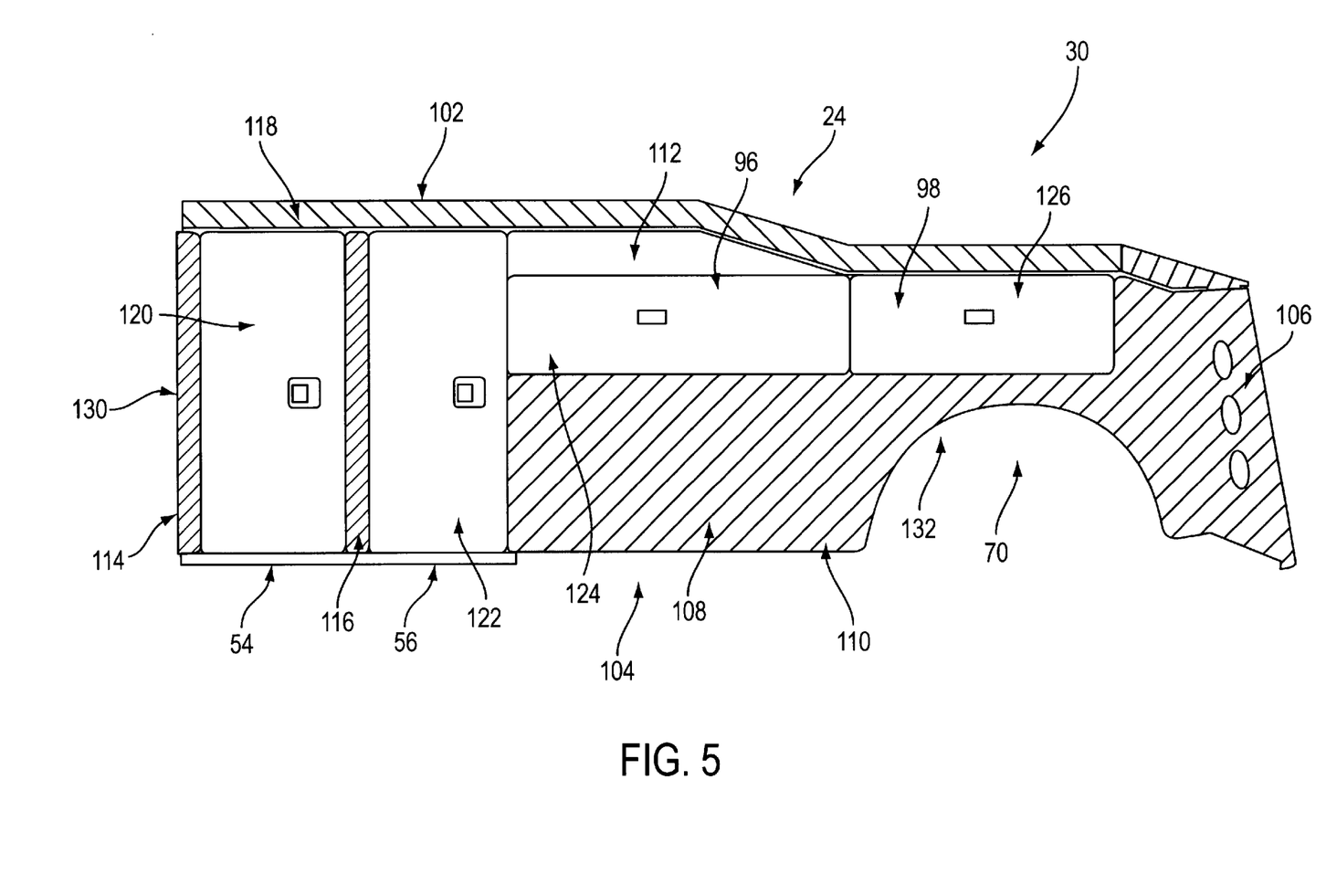
FIG. 5 is a side view of a left body unit of the present invention wherein the exterior panel is composed of aluminum.

FIGS. 3 and 4 show the preferred embodiment of the structural unit 28. The structural unit comprises a front panel 32 attached to a plurality of compartment panels 38. The plurality of compartment panels 38 are attached to a back panel 40. A top panel 42 is attached to the front panel 32 and the back panel 40. Each of the respective panels has at least one flange 44 along at least one edge.

As shown in FIGS. 3 and 4, the structural unit 28 of the preferred embodiment comprises front panel 32, and back panel 40. Attached in between the front panel and the back panel are a plurality of compartment panels 38. The compartment panels 38 comprise three vertical partition panels 48, 50, 52 defining two vertical storage compartments 54, 56. A bottom partition panel 58 defines the bottom of the two vertical storage compartments 54, 56. The front panel 32 has cut-outs 55, 57 to provide access to the respective storage compartments 54, 56.

A forward channel body mount 60 is attached to the middle vertical partition panel 50 for mounting the body unit 24, 26 to the truck chassis 22. First and second forward wheel well panels 62, 64 attached to front panel 32 and back panel 40 form the forward wheel well 66. A rear channel mount 65 is attached to the second forward wheel well panel 64. A horizontal center panel 68 affixed to front panel 32, back panel 40, and the first and second forward wheel well panels 62, 64, forms the top of the forward wheel well 66 and a rear wheel well 70. A rear panel 72 forms the rear surface 74 of the structural unit 28. A rear surface assembly 76 is formed by assembly of a first panel 78, a second panel 80, and a third panel 82. The top panel 42 comprises four separate panels 84, 86, 88, 90. A first, forwardmost, top panel 84 is disposed substantially horizontally. A second top panel 86 that is adjacent to the first top panel is disposed at an angle swept downward from the level of the first top panel 84. A third top panel 88 adjacent to the second top panel 86 is disposed substantially horizontally. A fourth top panel 90 is disposed adjacent to the third top panel 88 and is disposed at an angle swept downward from the level of the third top panel 88. A top panel support 92 is formed under the second top panel 86 to give it support. A middle panel 94 is disposed below a line formed where the second and third top panels 86, 88 meet. The middle panel 94 separates two horizontal storage compartments 96, 98. The front panel 32 has cut-outs 97, 99 to provide access to the respective storage compartments 96, 98.

The flanges 44 are formed on the respective panels by bending the respective panel or by attaching an angle element 100 to the respective panel.

In the preferred embodiment, the front panel 32, the back panel 40, the top panel 42, and the plurality of compartment panels 38 are attached by an adhesive 46 disposed on the flanges 44. A preferred adhesive suitable for use with the invention is VERSILOK brand acrylic adhesive, made by the Lord Corporation of Erie, PA. The acrylic adhesive preferably includes glass micro-beads to ensure even clamping and bonding.

The front panel 32, the back panel 40, the top panel 42, and the plurality of compartment panels 38 are each formed from lightweight rust-resistant materials. The preferred lightweight rust-resistant materials are composite materials and aluminum.

The composite components can be constructed from resin and fiber reinforcement systems which can be manufactured in a range of processes from resin transfer molding, compression molding, hand lay-up, reaction injection molding, or chopper gun. Resins can be polyester, vinylester, epoxy, or any alternate resin that can be manufactured using the above processes. Reinforcement fibers can run the full range of glass fiber, arimids, carbon fiber, or alternate fibers which when combined with resins listed above form structurally sound materials which meet the requirements of component.

FIGS. 5–8 show the body units 24, 26 with exterior panels 30 attached to exterior surfaces of the structural unit. An exterior top panel 102 is attached to the top panel 42, exterior front panels 104 are attached to the front panel 32, and an exterior rear panel taillight assembly 106 is attached to the rear surface 74 of the structural unit.

In a preferred embodiment the exterior front panel 104 comprises an exterior fender panel 108 with an attached exterior flare panel 110, a fixed logo panel 112, and two exterior narrow panels 114, 116. The exterior panel is formed from lightweight rust-resistant material. Aluminum or composite material may be used as the material of construction. Molded composite panels are the preferred embodiment.

In a preferred embodiment the exterior top panel 102, the exterior front panel 104, and the exterior rear panel taillight assembly 106 are each removably attached to provide for replacement.

In the preferred embodiment a top surface 118 of the exterior top panel 102 is slanted downwards from the back panel 40 towards the front panel 32 at approximately a 10-degree angle.

Figure 7:
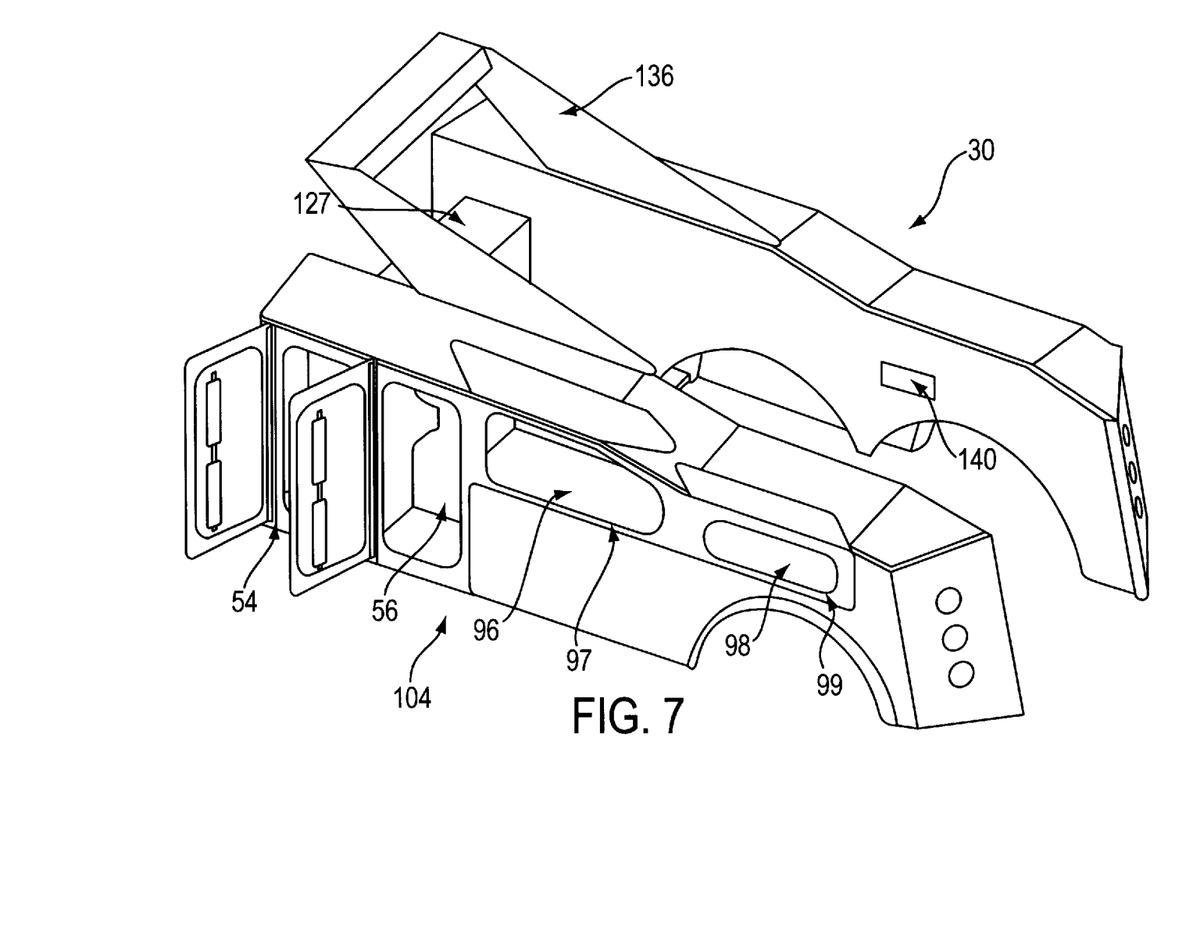
FIG. 7 is an isometric view of the body assembly of the present invention with storage compartment doors open.
Figure 8:
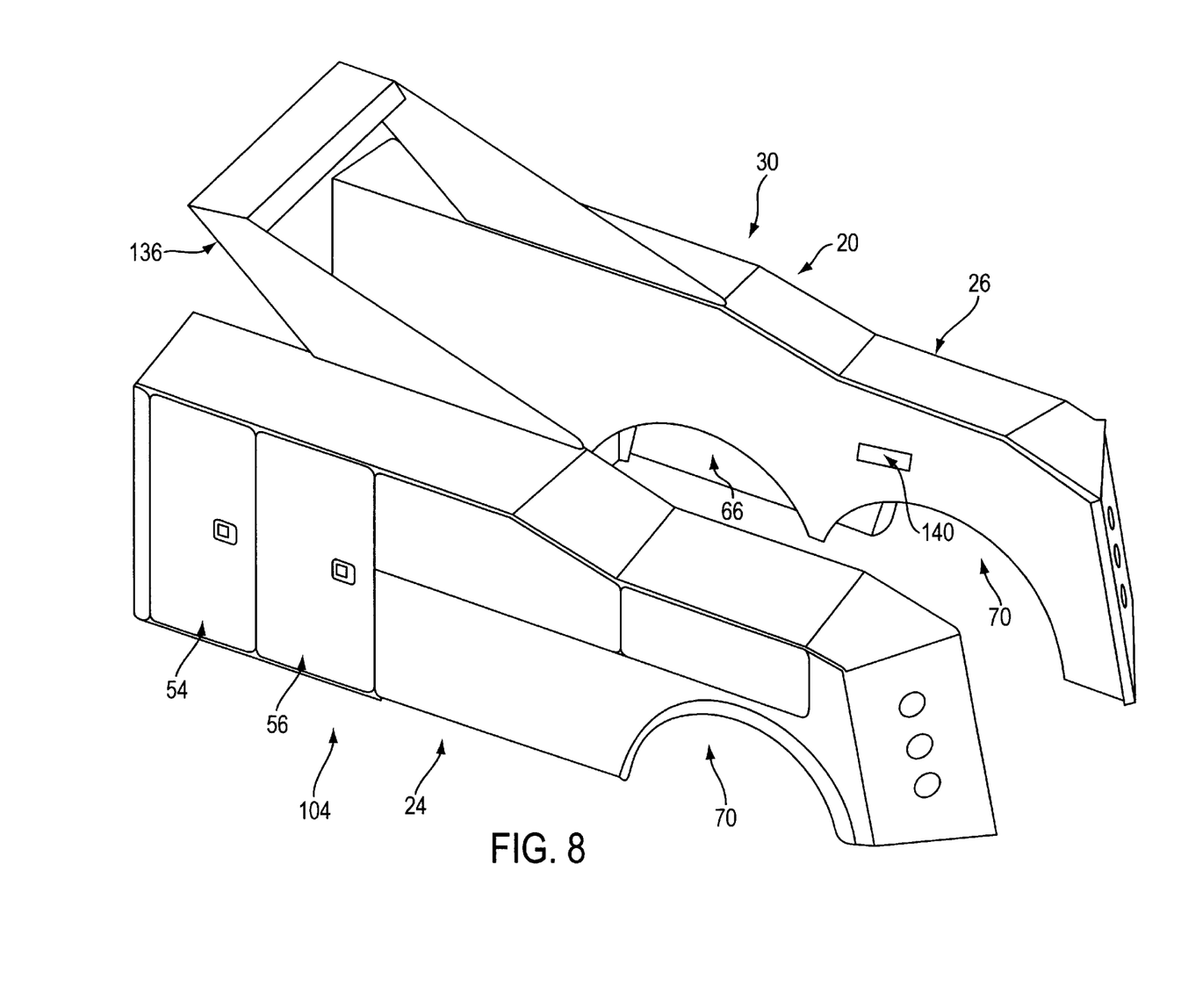
FIG. 8 is an isometric view of the body assembly of the present invention.

Doors 120, 122, 124, 126 are disposed in the respective front panel storage compartment cutouts 55, 57, 97, 99. The doors 120, 122, 124, 126 are formed from lightweight rust-resistant material such as aluminum or composite material. Composite material is the preferred material of construction.

A forward through compartment 127 is attached to the back panels 40 of both the left body unit 24 and the right body unit 26 opposite to the front panel cutouts 55 for the first vertical storage compartment 54. The forward through compartment 127 connects the left body unit 24 and the right body unit 26 and provides storage for lengthy tools and towing equipment.

Figure 6:
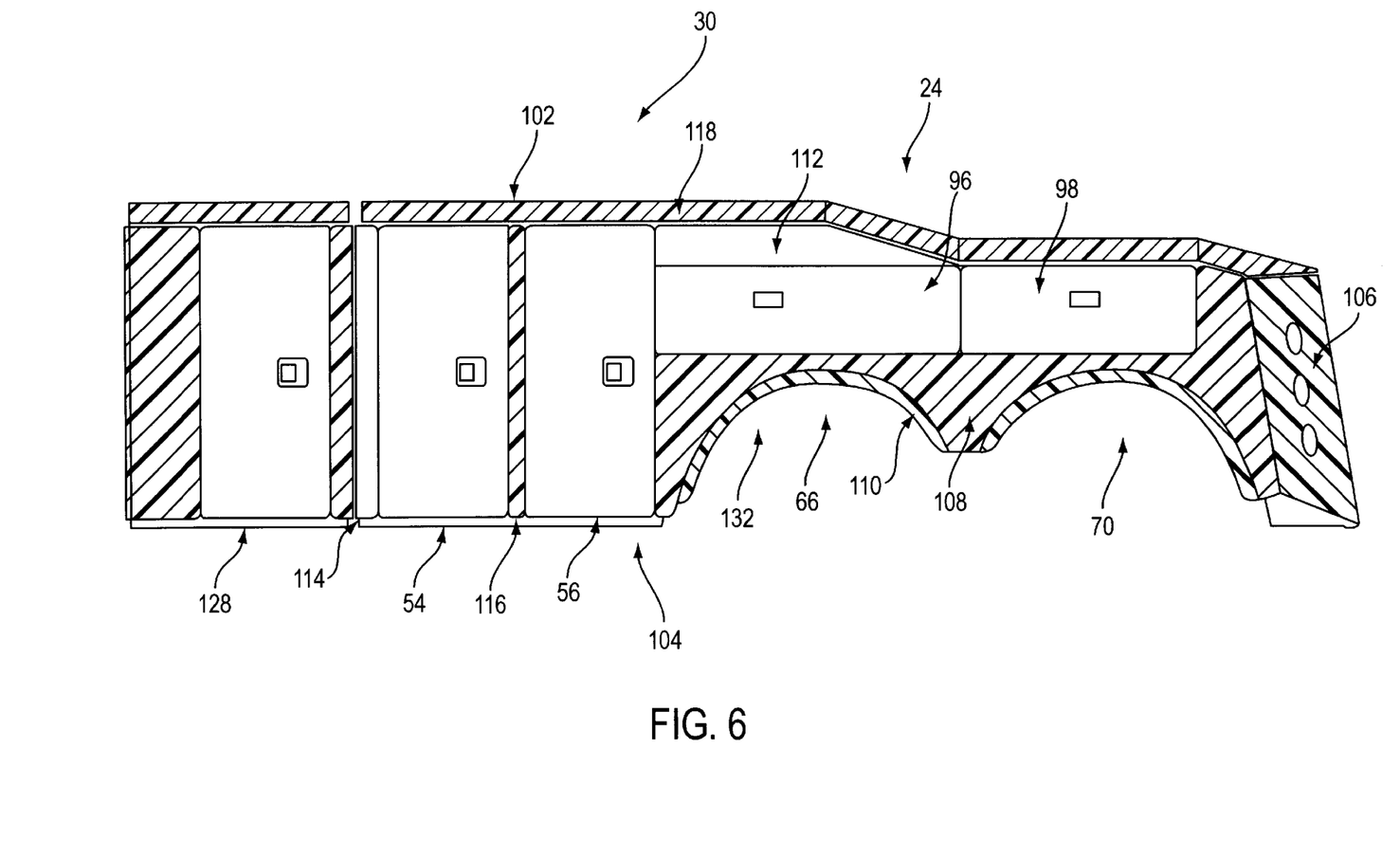
FIG. 6 is a side view of an alternative embodiment of the left body unit of the present invention wherein the exterior panel is composed of a composite material.

Variations of the invention are possible. For example, as shown in FIG. 6 an alternative embodiment of the present invention includes additional storage compartment modules 128 disposed adjacent to a forward surface 130 of the structural unit 28 in order to provide additional length to the body units 24, 26 so that body assemblies 20 can be formed in different sizes using the same body units 24, 26. This cuts down on the inventory required to outfit a variety of truck chassis types and sizes.

Depending upon the type of truck chassis the body assembly 20 is going to be attached to, single axle or tandem, the exterior fender panel 108 has one wheel well cutout 132 corresponding to the rear wheel well 70 or two wheel well cut-outs corresponding to both the forward and rear wheel wells 66, 70. This allows for the same structural unit 28 with two wheel wells 66, 70 to be used for both single and tandem axle truck chassis. In the case of a single axle truck chassis, the exterior front panel 104 covers up the forward wheel well 66. A variation on the present invention includes the use of additional wheel wells to accommodate truck chassis with additional axles.

In yet another variation panel rigidity, such as of the front panel 32, back panel 40, top panel 42, and the plurality of compartment panels 38, can be enhanced by use of cores molded into the individual components. These core materials can consist of any rigid, stable, closed cell foam or alternate material compatible with the resin chosen. The cores are inserted into the molds and the resin and fiber materials are formed and cured around them to result in a structurally sound component which minimizes weight and maximizes structural integrity.

In another variation the panels can be adhesively attached using a plurality of rivets or other fasteners to align and clamp the respective panels being adhesively attached during the adhesive setting period. An alternative process uses clamp members to align and clamp the respective panels being attached.

In another alternative embodiment the exterior panels may be permanently attached through the use of adhesive.

In yet another variation the preferred embodiment includes a light pylon structure 136 for supporting a pylon light assembly, the light pylon structure 136 being attached to the left body unit 24 and to the right body unit 26 by light pylon mounting assemblies 138.

In still another variation, the back panel of each unit may be provided with a cutout 140 for control elements (not shown) for tow-truck equipment.

Of course it should be understood that a wide range of changes and modifications can be made to the preferred embodiment described above. It is therefore intended that the foregoing detailed description be regarded as illustrative rather than limiting, and that it be understood that it is the following claims, including all equivalents, which are intended to define the scope of the this invention.

What is claimed is:

1. A body unit, for attachment to a truck chassis, comprising an exterior panel attached to a structural unit, wherein the structural unit comprises:
   a structural front panel with at least one flange formed on at least one edge;
   a plurality of storage compartment panels attached to the structural front panel, each of the plurality of storage compartment panels having at least one flange formed on at least one edge;
   a structural back panel, with at least one flange formed on at least one edge, attached to the plurality of storage compartment panels; and
   a structural top panel, with at least one flange formed on at least one edge, attached to the structural front panel and attached to the structural back panel; and
   wherein the structural front panel, the structural back panel, the structural top panel, and the plurality of storage compartment panels are attached by adhesive disposed on each flange to form the structural unit and define at least one storage compartment.

2. The body unit as claimed in claim 1, wherein the adhesive comprises an acrylic adhesive.

3. The body unit as claimed in claim 2, wherein the acrylic adhesive further comprises glass micro-beads.

4. The body unit as claimed in claim 1, wherein the structural front panel, the structural back panel, the structural top panel, and the plurality of storage compartment panels are each composed of a lightweight rust-resistant material.

5. The body unit as claimed in claim 4, wherein the lightweight rust-resistant material comprises aluminum.

6. The body unit as claimed in claim 1, wherein the exterior panel is composed of a lightweight rust-resistant material.

7. The body unit as claimed in claim 6, wherein the lightweight rust-resistant material comprises aluminum.

8. The body unit as claimed in claim 6, wherein the lightweight rust-resistant material comprises a composite material.

9. The body unit as claimed in claim 6, wherein the exterior panel comprises an exterior top panel attached to the structural top panel, an exterior front panel attached to the structural front panel, and an exterior rear panel taillight assembly attached to a rear surface of the structural unit.

10. The body unit as claimed in claim 9, wherein a top surface of the exterior top panel is slanted downwards from the structural back panel towards the structural front panel at an approximately 10-degree angle.

11. The body unit as claimed in claim 9, wherein the exterior front panel comprises an exterior flare panel.

12. The body unit as claimed in claim 1, wherein the structural front panel further comprises at least one cutout for access to the at least one storage compartment and a door disposed in the at least one cutout.

13. The body unit as claimed in claim 1, further comprising at least one storage compartment module disposed adjacent to a forward surface of the structural unit.

14. The body unit as claimed in claim 1, wherein the structural front panel and the structural back panel each has at least one wheel well cutout to provide clearance for at least one truck wheel.

15. The body unit as claimed in claim 14, further comprising an exterior front panel attached to the structural front panel, the exterior front panel having at least one wheel well cutout corresponding to the at least one wheel well cutout of the structural front panel.

16. The body unit as claimed in claim 15, wherein
   the structural front panel and the structural back panel each has a plurality of wheel well cutouts,
   the exterior front panel has at least one less wheel well cutout than the plurality of wheel well cutouts of the structural front panel,
   each wheel well cutout of the exterior front panel corresponds to one of the wheel well cutouts of the structural front panel, and
   an excess wheel well cutout of the structural front panel, not corresponding to one of the wheel well cutouts of the exterior front panel, is covered by the exterior front panel.

17. The body unit as claimed in claim 1, wherein each flange is formed by bending a respective said panel or by attaching at least one angle element to each said respective panel.

18. A body assembly, for attachment to a truck chassis, comprising a left body unit and a right body unit, wherein each body unit comprises a structural unit and an exterior panel attached to the structural unit, wherein each structural unit comprises:
   a structural front panel with at least one flange formed on at least one edge;
   a plurality of storage compartment panels attached to the structural front panel, each of said plurality of storage compartment panels having at least one flange formed on at least one edge;
   a structural back panel, with at least one flange formed on at least one edge, attached to the plurality of storage compartment panels; and a structural top panel, with at least one flange formed on at least one edge, attached to the structural front panel and attached to the structural back panel;

wherein the structural front panel, the structural back panel, the structural top panel, and the plurality of storage compartment panels are attached by adhesive disposed on each flange to form the structural unit thereof and define at least one storage compartment.

19. The body assembly as claimed in claim 18, wherein the adhesive comprises an acrylic adhesive.

20. The body assembly as claimed in claim 19, wherein the acrylic adhesive further comprises glass micro-beads.

21. The body assembly as claimed in claim 18, wherein the structural front panels, the structural back panels, the structural top panels, and the storage compartment panels are each composed of a lightweight rust-resistant material.

22. The body assembly as claimed in claim 21, wherein the lightweight rust-resistant material comprises aluminum.

23. The body assembly as claimed in claim 18, wherein each of the exterior panels is composed of a lightweight rust-resistant material.

24. The body assembly as claimed in claim 23, wherein the lightweight rust-resistant material comprises aluminum.

25. The body assembly as claimed in claim 23, wherein the lightweight rust-resistant material comprises a composite material.

26. The body assembly as claimed in claim 18, wherein, for each body unit, the exterior panel comprises an exterior top panel attached to the structural top panel, an exterior front panel attached to the structural front panel, and an exterior rear panel taillight assembly attached to a rear surface of the structural unit to which the exterior panel is attached.

27. The body assembly as claimed in claim 26, wherein, for each exterior panel, a top surface of the exterior top panel is slanted downwards from the structural back panel towards the structural front panel at an approximately 10-degree angle.

28. The body assembly as claimed in claimed 26, further comprising at least one storage compartment module disposed adjacent to a forward surface of each of the structural units.

29. The body unit as claimed in claim 26, wherein each exterior front panel comprises an exterior flare panel.

30. The body assembly as claimed in claim 18, wherein, for each structural unit, the structural front panel further comprises at least one cutout for access to the at least one storage compartment and a door disposed in the at least one cutout.

31. The body assembly as claimed in claim 18, further comprising at least one storage compartment module disposed adjacent to a forward surface of each of the structural units.

32. The body assembly as claimed in claim 18, wherein, for each structural unit, the structural front panel and the structural back panel each has at least one wheel well cutout to provide clearance for at least one truck wheel.

33. The body assembly as claimed in claim 32, wherein each structural unit further comprises an exterior front panel attached to the structural front panel, the exterior front panel having at least one wheel well cutout corresponding to the at least one wheel well cutout of the structural front panel.

34. The body assembly as claimed in claim 33, wherein, for each body unit, the structural front panel and the structural back panel each has a plurality of wheel well cutouts, the exterior panel has at least one less wheel well cutout than the plurality of wheel well cutouts of the structural front panel, each wheel well cutout of the exterior panel corresponds to one of the wheel well cutouts of the structural front panel, and an excess wheel well cutout of the structural front panel, not corresponding to one of the wheel well cutouts of the exterior panel, is covered by the exterior panel.

35. The body assembly as claimed in claim 18, wherein each flange is formed by bending a respective said panel or by attaching at least one angle element to each said respective panel.

36. The body assembly as claimed in claim 18, further comprising a forward through compartment attached to the structural back panel of the left body unit and attached to the structural back panel of the right body unit.

37. A body assembly, for attachment to a tow truck chassis, comprising a left body unit and a right body unit, wherein each body unit comprises a structural unit and an exterior panel attached to the structural unit;

wherein each structural unit comprises:

a structural front panel with at least one flange formed on at least one edge;

a plurality of storage compartment panels attached to the structural front panel, each of said plurality of storage compartment panels having at least one flange formed on at least one edge;

a structural back panel, having at least one flange formed on at least one edges, attached to the plurality of storage compartment panels; and a structural top panel, having at least one flange formed on at least one edge, attached to the structural front panel and attached to the structural back panel;

wherein the structural front panel, the structural back panel, the structural top panel, and the plurality of storage compartment panels are attached by adhesive disposed on each flange to form the structural unit thereof and define at least one storage compartment; and wherein each exterior panel comprises:

an exterior top panel attached to the structural top panel;

an exterior front panel attached to the structural front panel; and an exterior rear panel taillight assembly attached to a rear surface of the structural unit to which the exterior panel is attached.

38. The body assembly of claim 37, wherein:

the structural front panels, the structural back panels, the structural top panels, and the storage compartment panels are composed of a lightweight rust-resistant material; and the exterior top panels, the exterior front panels, and the exterior rear panel taillight assemblies are composed of a lightweight rust-resistant material.

39. The body assembly of claim 37, wherein:

the structural front panels, the structural back panels, the structural top panels, and the storage compartment panels are composed of aluminum; and the exterior top panels, the exterior front panels, and the exterior rear panel taillight assemblies are composed of a composite material.

40. The body assembly of claim 37, wherein the adhesive comprises an acrylic adhesive containing glass micro-beads.

41. The body assembly as claimed in claim 37, wherein, for each exterior panel, a top surface of the exterior top panel is slanted downwards from the structural back panel towards the structural front panel at an approximately 10-degree angle.

42. The body assembly as claimed in claim 37, wherein, for each structural unit, the structural front panel and the structural back panel each has at least one wheel well cutout to provide clearance for at least one truck wheel.

43. The body assembly as claimed in claim 42, wherein, for each exterior panel, the exterior front panel has at least one wheel well cutout corresponding to the at least one wheel well cutout of the structural front panel.

44. The body assembly as claimed in claim 37, wherein, for each body unit, the structural front panel and the structural back panel each has a plurality of wheel well cutouts, the exterior front panel has at least one less wheel well cutout than the plurality of wheel well cutouts of the structural front panel, each wheel well cutout of the exterior front panel corresponds to one of the wheel well cutouts of the structural front panel, and an excess wheel well cutout of the structural front panel, not corresponding to one of the wheel well cutouts of the exterior front panel, is covered by the exterior front panel.

45. The body assembly as claimed in claim 37, further comprising a forward through compartment attached to the structural back panel of the left body unit and attached to the structural back panel of the right body unit.

46. The body assembly as claimed in claim 37, further comprising at least one storage compartment module disposed adjacent to a forward surface of each of the structural units.

47. A method of manufacturing a body assembly for attachment to a tow truck chassis, said body assembly comprising a left body unit and a right body unit, wherein each body unit comprises a structural unit and at least one external panel, said method comprising the steps of:

(1) forming each structural unit by steps comprising attaching a structural front panel, with at least one flange formed on at least one edge, to a plurality of storage compartment panels, each storage compartment panel having at least one flange formed on at least one edge;

attaching the plurality of storage compartment panels to a structural back panel having at least one flange formed on at least one edge;

attaching a structural top panel, having at least one flange formed on at least one edge, to the structural front panel and to the structural back panel; and bonding the structural front panel, the structural back panel, the structural top panel, and the plurality of storage compartment panels by an adhesive disposed on each flange, wherein the structural front panel, the structural back panel, the structural top panel, and the plurality of storage compartment panels form the structural unit thereof and define at least one storage compartment; and (2) forming each body unit by steps comprising attaching the at least one external panel to the structural unit.

48. The method of manufacturing the body assembly of claim 47, wherein forming each body unit further comprises the steps of:

attaching an exterior top panel to the structural top panel;

attaching an exterior front panel to the structural front panel; and attaching an exterior rear panel taillight assembly to a rear surface of the structural unit.

49. The method of manufacturing the body assembly of claim 48, wherein:

the structural front panels, the structural back panels, the structural top panels, and the storage compartment panels are composed of aluminum; and the exterior top panels, the exterior front panels, and the exterior rear panel taillight assemblies are composed of a composite material.

50. The method of manufacturing the body assembly of claim 47, further comprising using a plurality of rivets to align and clamp the respective structural panels being attached during the bonding step.

51. The method of manufacturing the body assembly of claim 47, further comprising using at least one clamp member to clamp the respective structural panels being attached during the bonding step.

52. The method of manufacturing the body assembly of claim 47, wherein the adhesive comprises an acrylic adhesive containing glass micro-beads to facilitate even spacing during the bonding step.

* * * * *

UNITED STATES PATENT AND TRADEMARK OFFICE
CERTIFICATE OF CORRECTION

PATENT NO. : 5,839,775
DATED : November 24, 1998
INVENTOR(S) : Young et al.

It is certified that error appears in the above-identified patent and that said Letters Patent is hereby corrected as shown below:

In the Claims:

Claim 37, line 13, change "edges" to --edge--.

Signed and Sealed this

Seventeenth Day of October, 2000

*Attest:*

Q. TODD DICKINSON

*Attesting Officer*　　　　　　*Director of Patents and Trademarks*